United States Patent

[11] 3,590,166

[72] Inventors Andreas Anschutz Nurnberg; Richard Gierer, Hersbruck; Gottfried Sentner, Nurnberg, all of, Germany

[21] Appl. No 721,269
[22] Filed Apr. 15, 1968
[45] Patented June 29, 1971
[73] Assignee U. S. Philips Corporation New York, N.Y.
[32] Priority Apr. 14, 1967
[33] Germany
[31] T33656

[54] METHOD OF AUTOMATICALLY ESTABLISHING TELEPHONE CONNECTION TO AND FROM MOBILE RADIOTELEPHONE STATIONS
1 Claim, 1 Drawing Fig.

[52] U.S. Cl. .......... 179/41 A
[51] Int. Cl. .......... H04q 7/00
[50] Field of Search .......... 179/41 A; 325/55, 64, 177

[56] References Cited

UNITED STATES PATENTS

| | | | |
|---|---|---|---|
| 3,351,714 | 11/1964 | Kunzelman et al. .......... | 179/41 A |
| 3,268,664 | 8/1966 | Fleissner et al. .......... | 325/55 |
| 3,458,664 | 7/1969 | Adlhoch et al. .......... | 343/177 |

*Primary Examiner*—Kathleen H. Claffy
*Assistant Examiner*—Thomas L. Kundert
*Attorney*—Frank R. Trifari

ABSTRACT: A method of automatically establishing connections between mobile and fixed radiotelephone stations through fixed duplex channels wherein connections are made from the fixed station on a single channel having a different frequency than that of the speech channels. The free speech channel information, the mobile station identification, the signals for holding, answering, starting, continuing and requesting a call are all made on two voice frequencies by pulse code modulation.

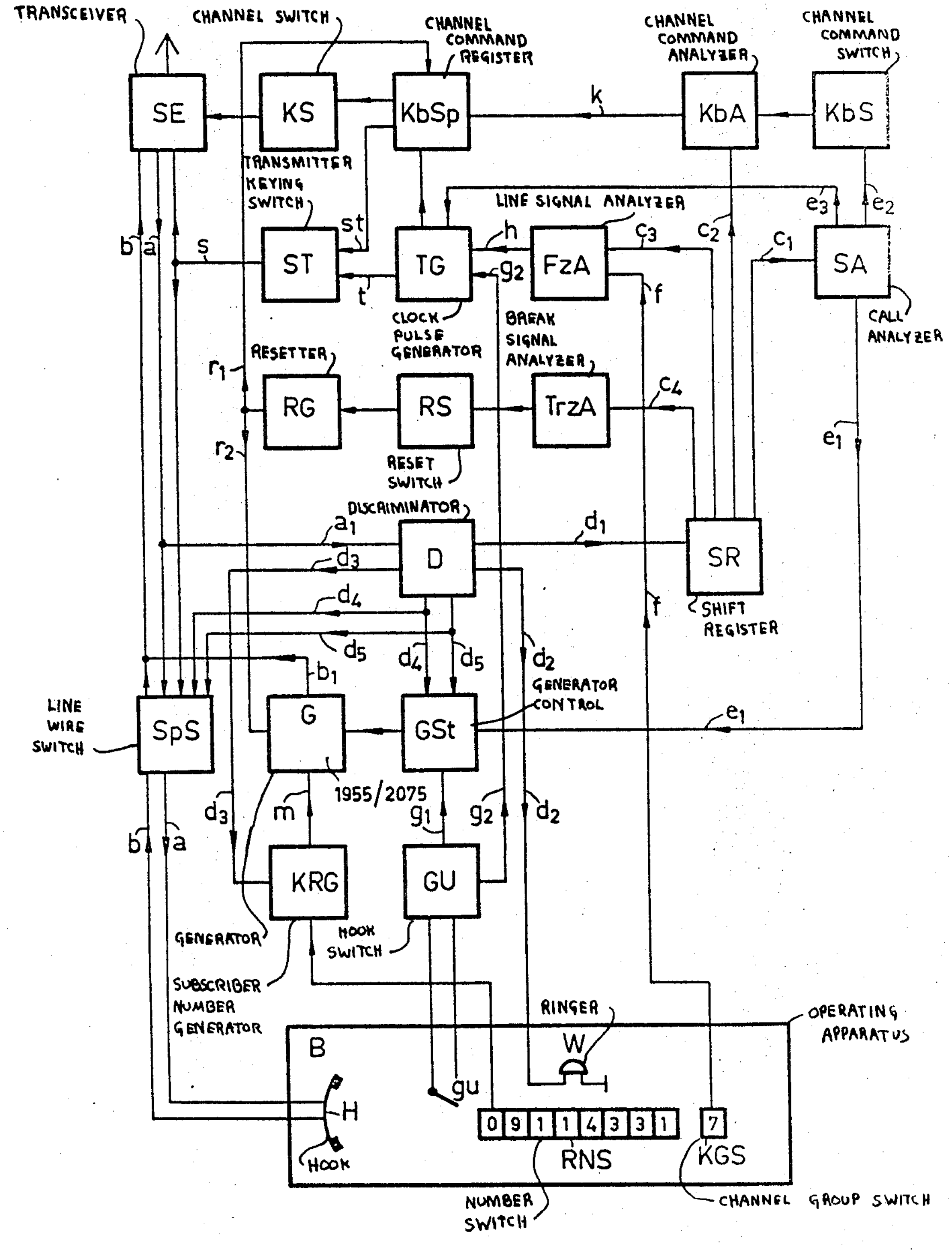
INVENTORS
ANDREAS ANSCHUTZ
RICHARD GIERER
BY GOTTFRIED SENTNER
AGENT

METHOD OF AUTOMATICALLY ESTABLISHING TELEPHONE CONNECTION TO AND FROM MOBILE RADIOTELEPHONE STATIONS

This invention relates to a method of automatically establishing telephone connections to and from mobile radiotelephone stations through duplex channels with fixed stations in a radio system, in which the speech channels of the local regions of operation are arranged in groups of channels with a characteristic idle signal identifying each channel group, and in which a connection within such a region from a fixed station to a mobile station is established by a selective call through a single exclusive calling channel of the same frequency for all the mobile stations in the whole radio system, the carrier of which channel is emitted only temporarily for the selective call and a channel command, and in which a connection from a mobile station is established through a free speech channel by transmission of the station identification and the subscriber's number desired.

In known public mobile radiotelephony systems in operation today, the calls between line subscribers and radio subscribers are set up through manually operated telephone exchanges. For a more rational use of the radio speech channels and to reduce the cost of labor, it is planned to introduce the concept of automatic dialing also for this branch of intelligence technique, that is to say that any subscriber of the public line-telephone system can reach any subscriber of a mobile telephone station, and vice versa, automatically by dialing the number and hence without the intermediary of a manual telephone exchange.

Consideration has been given for a long time to automate the establishment of connections to mobilophone stations (cf. Telefunkenzeitung 1957, No. 115, page 38; Fernmelde-Ingenieur 1959, No. 2, page 17). From a series of German patent specifications: Nos. 902,742; 1,000,171; 1,025,023 and 1,110,253) methods and circuits for automatically setting up connections between subscribers of line telephony and radio telephony have come to be known. These relate to the manner of selectively calling radio subscribers by voice-frequency code signals with a four-tone or double-tone call by the full-code method or partial-code method. Because of its adequate safety especially against speech simulation the method of four tones and full code has been introduced into same public mobile radiotelephony systems with manual operation. For a 4-out-of-20 code and a 4-out-of-40 code, each transmitting station requires respectively the use of 20 and 40 voice-frequency generators of high constancy and accuracy, the receivers needing as many high-sensitive resonance relays. Owing to the limited number capacity and the difficult and extensive coding and decoding, this method is unsuitable for an automatic connecting method.

It has previously been suggested to arrange the said voice-frequency generators only in the fixed station and to radiate the voice frequencies upon request from a mobilophone station, in order to be available at this station for automatically selecting the relevant subscriber by a corresponding selection (German Pat. No. 1,000,071 or by a combination with other voice frequencies produced in the mobilophone station (German Pat. No. 1,110,253).

In addition to the selective call from the radio subscribers still further information is necessary for putting through a connection, such as, for example, idle signal, start signal, answering signal and end-of-call signal. The traditional method utilizes for this purpose frequencies which lie outside the frequencies for the selective call and which must be produced by further voice-frequency generators.

Telephone traffic without long waiting times can be realized only if a free radio channel is available at any time. Therefore a certain number of radio channels must be made available in each region of operation (see "Fernmelde Ingenieur" 1959, No. 2, page 18) to which channels the mobilophone stations can be switched at will. In existing public mobile radiotelephony systems a plurality of radio channels for dealing with the traffic are already available in certain large regions of operation. The call to the mobilophone station is then made on a given speech channel to which the mobilophone stations are either adjusted or have to be readjusted by hand after each coil. It is then necessary to take in consideration that these channels may differ for certain groups of vehicles or according to their region of operation. To put through a connection from a mobilophone station, it is necessary to find therein manually a speech channel which is free. For calling the fixed station a ringing tone is emitted and, after the fixed station has answered the call, the desired subscriber's number is given verbally.

From German Pat. No. 1,069,709 a method of automatic channel selection is known in which the fixed station within each channel emits a signal depending on the busy condition of the fixed station, for blocking those mobile stations which do not take part in the traffic. This signal is used additionally as a criterion for the channel selection in order that, if a main channel is engaged by a mobile station, the other associated mobile stations are automatically switched to the neighboring channel by means of a combination of relays incorporated in each mobile station. After a certain period the mobile stations are automatically and, when the main channel is released, definitely switched back to the main channel. In this method, upon each radio call the channel selectors even of all those mobilophone stations which do not take part in this call are switched over for the first time at the beginning of the call and again and again during the call.

For the state of the art, reference is also made to known radiotelephone systems (Techn. Mitt. P.T.T. 29 (1951), 5, pages 168 to 177 and Bull. ASE 54, 1963, pages 201 to 205), in which the call of a mobile subscriber is made by a time-divided series of digits with frequency-shift keying and in which one of the shifting frequencies, given as a long tone, is used as a preparative pulse or end of dial pulse. Two pairs of different shifting frequencies are used for each of the two directions of traffic. The connection is put through on only one pair of channels by direct conversion of the DC dial pulses into the shifting frequencies. The selective call to the mobilophone station is checked by a cross-sum test so that the number of possible subscribers for a given number of digits of the subscriber's number is limited considerably. No test is made of the subscriber's number transmitted in establishing the connection from the mobile station, thus involving a great risk of errors in the subscriber's numbers through interference, especially in regions of low field strength. The direct conversion of the dial pulses into the shifting frequencies increases the time for emitting information through the radio channel in an uncontrollable manner according to the speed of dialing the desired subscriber's number, which usually consists of many digits. The method is unsuitable for a system of large extension which is divided into several local regions of operation in which a connection from and to mobile subscribers is to be established by automatic dialing.

An object of the invention is to provide a method of automatically establishing telephone connections from and to mobile radiotelephone stations, in which the operations required, especially in the mobile station, for making available and receiving the information necessary for making the connection remain within limits justified economically. The term "-necessary information" is to be understood to mean:

a. the idle signal for the speech channels of the channel groups, b. the selective call with channel command on the calling channel, c. the signal for holding the call on the channel allotted, d. the answering of the call from the mobilophone station on the allotted speech channel, e. the start signal from the mobilophone station for changing over to the speech condition, f. the calling signal from the mobilophone station in a speech channel of a given channel group, g. the request signal from the fixed station for the transmission of the station identification of the mobile station and the desired subscriber's number, h. the identification signal of the mobile station and the desired subscriber's number (numbers of many digits), i. the selective reverse call for switching off mobilophone stations having switched to the speech channel as the connection is established, j. the clearing signal for the secure switching off of the mobilophone station by the fixed station, and k. the end of call for terminating the speech condition of the connection.

The solution must be usable in a system of large extension and also be extensible to serve a large number of subscribers, for example, 100,000.

According to the invention this object is attained by a method which is characterized in that the information to the mobile station on the calling channel (selective call, channel command), the identification of the speech channels and of the channel groups (idle signal), and the clearing signal from the fixed station, and also the information from the mobile station (identification, desired subscriber's number) are stored as a series of digits into fixed or adjustable registers in the stations, and that these stored series of digits are modulated on the corresponding high frequency carrier of the fixed station or the mobile station in the required sequence in accordance with a coding method which is the same for all kinds of information and at voice frequencies which are the same for both directions of traffic.

The series of digits for the information could be coded in known manner, for example, by 10 or 11 separate voice frequencies associated with the digits, or by a 2-of-5 code with five different voice frequencies. In these cases a total of 10 or five different voice frequencies would be necessary. Very suitable for this purpose is a pulse-code method in which each separate figure is represented by keying two voice frequencies. In this case, on the one hand, each station requires only one voice-frequency generator which can be switched over to either frequency and, on the other hand, these frequencies can be formed by suitable combination into pulse telegrams which have a very great safety against errors in the transmission of the information.

In a further elaboration of the invention the voice frequencies employed, each given separately as a continuous signal, serve for the transmission of further information, such as, for example, start signal, end-of-call signal, answering of the call. The duration of the signals may differ according to the function thereof and lies between several milliseconds and several seconds. Each signal is terminated as will be demonstrated in detail by the embodiment following hereinafter, by the operations which have to be brought about by the relevant signal.

In order that the invention may be readily carried into effect it will now be described in detail, by way of example, with reference to one embodiment of a mobile station using the above-mentioned keying of frequencies, for example, of 1,955 c.p.s. and 2,075 c.p.s.

It is assumed that the carrier of the calling channel is engaged only by the fixed station and emitted by the fixed station only for the duration of a call to a mobile station. The call comprises as information the selective call for the desired mobilophone subscriber and a channel command. The channel command indicates to the relevant mobilophone station which pair of speech channels (duplex channel) must be used for the call. The selective call and the channel command are modulated as a time-divided series of digits on the carrier of the calling channel.

In each local region of operation of a fixed station a plurality of pairs of speech channels are usually available, which form a channel group. The speech channel carriers continuously emitted by each fixed station are modulated, for the purpose of identifying the channel group, by an idle signal typical of the channel group in the form of a time-divided series of digits, insofar these carriers are not engaged by a call. All mobile stations in operation are adjusted to receive the carrier from the calling channel. The establishment of a telephone connection now proceeds, according to the direction of establishing, in the following manner:

ESTABLISHMENT OF A CONNECTION FROM A LINE SUBSCRIBER TO A MOBILE STATION

The line subscriber first selects the identification number of the region of operation in which the mobile subscriber is presumably present; subsequently he dials the subscriber's number of the mobilophone station. As soon as the line subscriber has engaged the fixed station, he is given a free pair of speech channels by the station by switching off the idle signal on this channel and, instead thereof, transmitting a continuous tone of, for example, 2,075 c.p.s. for the further establishment of the connection and for holding the call. The series of DC dial pulses for the subscriber's number are stored in the fixed station until they are complete, then changed to a time-divided series of digits and radiated as a selective call via the carrier of the calling channel which has in the meantime been switched on, by keying the voice frequencies 1,955 c.p.s. and 2,075 c.p.s.

Following the selective call, the so-called channel command, again in the form of a time-divided series of digits is transmitted on the calling channel from a fixed register associated with the selected speech channel, which channels command signals to the called mobile station to which pair of speech signals the transceiver of the station has to be switched. The selective call and the channel command are transmitted not more than twice, in order to reduce the period of engagement of the calling channel as far as possible. The period of transmission for selective call and channel command is approximately 1 sec.

The reception of the calling information and the further operation for establishing the connection will be described with reference to the circuit diagram for the mobile station. The arrows on the connecting leads indicate the direction of the transmission of information.

The high frequency receivers of the mobilophone stations are adjusted to the frequency of the calling channel by an electronic channel switch KS in all the mobilophone stations which are not engaged. The high frequency transmitter is still inoperative. The voice-frequency signals which are present, at the receipt of a calling information, at the output of the receiver after demodulation reach through a lead *a1* a discriminator D which converts the said signals into corresponding DC signals. In the assumed method of frequency shift keying the discriminator responds only to the two frequencies 1,955 c.p.s. and 2,075 c.p.s. The DC signals from the discriminator pass through a lead *d1* to the shift register with code test SR.

If the code of the information for the selective call is found to be correct it is passed on through a lead *c1* to the selective call analyzer SA. In the desired mobilophone station this analyzer responds and gives, on the one hand, a signal for answering the call through a lead *e1* to the generator control GS*t* and, on the other hand, a switching-on signal through a lead $e_2$ for the channel command switch K*b*S. The generator control causes the generator G to send through a lead *b1* a continuous tone of the frequency 1,955 c.p.s. to the mobile transmitter as an answer to the call.

The channel command switch K*b*S prepares the channel command analyzer K*b*A for receiving the next information, the channel command, which passes through a lead *c2* from the shift register SR to the channel command analyzer K*b*A. This gives a corresponding signal through a lead *k* and the channel command register K*b*S*p* to the channel switch KS. The channel switch adjusts the transceiver SE to the commanded channel. The channel command register holds the adjusted channel until the arrival of a resetting command and on leaving its rest position switches on, through a lead *st*, a switch ST ("transmitter keying") and, through a lead *s*, the carrier from the mobile station which, modulated by the frequency of 1,955 c.p.s., is now radiated for answering the call. This tone signals to the fixed station that the selected mobilophone station is reached.

The high frequency receiver of the mobile station which has been switched to the speech channel now receives the continuous tone of 2,075 c.p.s. which has been radiated by the fixed station since the engagement and which passes from the discriminator D through a lead *d2* to an operating apparatus B to signal the call there optically or acoustically, for example, with a ringer W. The connection between line subscriber and mobile subscriber thus finds itself in the calling state.

This calling state is retained, until the mobile subscriber picks up the handset or until, after a period determined by limitation of the calling period, a determined time-divided series of digits as a clearing signal is given by the fixed station instead of the tone of 2,075 c.p.s.

When the hook H is lifted from the operating apparatus B of the mobile station, a switch *gu* causes an electronic hook switch GU via a lead *g1* and the generator control GS1 to shift the generator from 1,955 c.p.s. to 2,075 c.p.s. as a start signal to the fixed station. In the fixed station the continuous tone of 2,075 c.p.s. is then switched off, the absence of which in the receiver of the mobilophone station switches off the start signal through a lead *d5* to the generator control GS*t*. A line wire switch S*p*S interconnects the low frequency telephone leads *a*, *b* as soon as the signal for switching on the transmitter—from the transmitter keying through lead *s*,—appears thereon and the 2,075 c.p.s. continuous signal—from the discriminator D through lead *d5*—has disappeared. The speech condition is thus established.

ESTABLISHING A CONNECTION FROM MOBILE STATION TO LINE SUBSCRIBER

Prior to the establishment of a connection from a mobile station it is necessary first to adjust therein, by means of a channel group switch KGS of the operating apparatus B, the channel group of the region of operation which can be reached by the mobile station. If a plurality of regions of operation can be reached from a mobilophone station, the mobile subscriber can find out the optimum connecting path by a suitable choice of the channel groups. The channel group switch acts through a lead *f* on an idle signal analyzer F*z*A in such manner that this causes the adjustment of the channel switch KS only on a free radio channel of the preselected channel group, the idle signal of which passes from the receiver through lead *a1*, discriminator D, lead *d1*, shift register SR, lead *c3* to the line signal analyzer F*z*A.

Furthermore, in the mobile station, before lifting the hook H, the desired subscriber's number is adjusted by a subscriber's number switch RNS. When the hook H is picked up the hook switch GU switches on via a lead *g1* and the generator control GS1 the generator G so as to be prepared for 2,075 c.p.s. A clock-pulse generator TG is operated via another lead *g2* of the hook switch GU. This clock-pulse generator switches the channel command register K*b*S*p* further in a stepwise manner, thus causing the channel switch KS to switch the transceiver SE successively to the various speech channel frequencies. The time it remains in each position is longer than the time for two idle signal telegrams.

When the channel switch reaches a channel the idle signal telegram of which is recognized in the idle signal analyzer F*z*A to be identical with that for the preadjusted channel group, the clock-pulse generator TG is held via a lead *h* and the transmitter is switched on through a lead *t* from the clock-pulse generator TG to the transmitter keying ST. This transmitter now radiates on its carrier the frequency 2,075 c.p.s. as a call signal to the fixed station. This station subsequently radiates, instead of the idle signal, a continuous tone of 1,955 c.p.s. as a request signal for passing on the identification of the mobile station and the desired subscriber's number. In the receiver of the mobile station the discriminator D responds to these 1,955 c.p.s. and starts, through a lead *d3*, an identification and subscriber's number generator KRG which now keys through a lead *m* the two frequencies 1,955 c.p.s. and 2,075 c.p.s. of the generator in accordance with the fixedly adjusted identification of the vehicle and the preselected subscriber's number. The identification of the vehicle and the desired subscriber's number are thus modulated as a time-divided series of digits on the high frequency carrier of the mobile station.

After receipt of the identification by the fixed station, this identification is emitted therefrom as a selective reverse call instead of the 1,955 c.p.s., so that the calling station to which the identification corresponds remains in the calling state, whereas in all the mobilophone stations which may likewise have tested on this channel prior to switching off the idle signal, the channel switch is switched to an other free channel through lead *e3* from the selective call analyzer to the clock-pulse generator TG. By this step, double engagements during a call are prevented. By the switching off of the continuous tone of 1,955 c.p.s. the identification and subscriber's number generator is held in the mobilophone station if not switched off automatically after delivery of its telegrams and possibly a repetition. Furthermore, interconnection of the line wires is brought about through a lead *d4* from discriminator D to the line wire switch S*p*S and the generator G is switched off via the generator control GS*t*. The establishment of the connection is thus completed.

RELEASE OF THE CONNECTION

After the conversation, the radio connection can be released by the fixed station or the mobile station. In either case the release is initiated in the usual manner by replacing the hook.

When the mobile subscriber replaces the hook the generator of 2,075 c.p.s. is switched on via lead *g1* and the generator control GS*t*, this frequency being emitted as a continuous tone to the fixed station (end of call). The fixed station then emits the release signal consisting of a time-divided series of digits, until the radio subscriber is switched off from the radio channel. This is effected due to the release signal in the mobile station passing via the discriminator D to the shift register SR and thence via lead *c4* and a break signal analyzer T*rz*A to a reset switch RS. The latter causes via a resetting element RG and a lead *r1* the resetting of the channel command register K*b*S*p* to the initial position and hence the changeover of the channel switch KS to the calling channel. This operation also causes switching off of the transmitter, the line wire switch S*p*S and the generator G via a lead *r2*. After the transmitter has been switched off, the fixed station again emits the idle signal instead of the release signal on the speech channel just used. When the communication from the fixed station is broken, this station emits the release signal which brings about the above-described operations in the mobile station.

The invention is not confined to the use of coding by keying two frequencies as has been described in the example. The described frequency-shift keying does manage for the transmission of any necessary information with the smallest number of generators for which, as is well known, a high constancy of frequency must be demanded, and guarantees great safety against errors in the transmission. The analyzers can partly be used in common for the various kinds of information, thus permitting the technical setup to be minimized.

The safety steps for the protection of speech are also of a small extent, since the information telegrams obtained by frequency-shift keying cannot be simulated by speech oscillations; delays in the response of the receivers must be provided only for the two frequencies used as continuous tones. The separate building elements for the analysis of the information for the described radiotelephone system may be built up with electronic means in a manner saving space and energy.

The storage of information, for example of the identification and the desired subscriber's numbers in the mobile station, and of the selective call, the channel command, the idle and release signals in the fixed station permits rapid transmission thereof at any given moment so that interference and decreases in field strength substantially remain without effect. On the other hand, the use of one frequency for the calling channel in the whole system is possible only due to the short transmission of the calling information, which is approximately 1 sec.

What we claim is:

1. A method of automatically establishing telephone connections to and from mobile radiotelephone stations through duplex channels with fixed stations in a radio system, in which speech channels of the local regions of operation are arranged in groups of channels with a characteristic idle signal identifying each channel group, and in which a connection within such a region from a fixed station to a mobile station is established by a selective call through a single exclusive calling channel of the same frequency for all the mobile stations in the whole radio system and different from any of the voice channel frequencies, the carrier of which calling channel is emitted only temporarily for the selective call and a channel command, and in which a connection from the mobile station is established through a free speech channel by a transmission of the station identification and the subscriber's number desired, characterized in that the information to the mobile station on the calling channel (selective call, channel command), the identification of the speech channels and of the channel groups (idle signal) and the clearing from the mobile station, and also the information from the mobile station (identification, desired subscriber's number) are stored as a series of digits in fixed or adjustable registers in fixed and mobile stations, that these stored series of digits are modulated on the corresponding high frequency carrier of the fixed station or the mobile station in the required sequence in accordance with a coding method which is the same for all kinds of information and at voice frequencies which are the same for both directions of traffic, and in that the fixed station in response to the reception of identifying pulses from a calling mobile station reemits this identification, and in that means are provided in each of the mobile stations for switching to a channel different from the channel assigned to the calling mobile station in response to the retransmission by the fixed station of mobile station identification other than that assigned to a mobile station.